US009871260B2

(12) United States Patent
Ribarov et al.

(10) Patent No.: US 9,871,260 B2
(45) Date of Patent: Jan. 16, 2018

(54) HYBRID EMERGENCY POWER UNIT SYSTEM

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 315 days.

(21) Appl. No.: 14/289,365

(22) Filed: May 28, 2014

(65) Prior Publication Data

US 2015/0349356 A1    Dec. 3, 2015

(51) Int. Cl.
| | |
|---|---|
| *H01M 8/04* | (2016.01) |
| *B64D 41/00* | (2006.01) |
| *H02J 9/06* | (2006.01) |
| *H02K 7/18* | (2006.01) |
| *H01M 8/04007* | (2016.01) |
| *H01M 8/04119* | (2016.01) |
| *H01M 8/04082* | (2016.01) |
| *H02J 4/00* | (2006.01) |

(52) U.S. Cl.
CPC ........ *H01M 8/04067* (2013.01); *B64D 41/00* (2013.01); *H01M 8/04156* (2013.01); *H01M 8/04201* (2013.01); *H02J 9/066* (2013.01); *H02K 7/1823* (2013.01); *B64D 2041/005* (2013.01); *H01M 2250/20* (2013.01); *H01M 2250/407* (2013.01); *H02J 4/00* (2013.01); *Y02B 90/14* (2013.01); *Y02T 90/32* (2013.01); *Y02T 90/36* (2013.01)

(58) Field of Classification Search
CPC ......... H01M 8/04201; H01M 8/04156; H01M 8/04067; H02K 7/1823; B64D 41/00; H02J 9/066
USPC ......... 429/436, 408, 427, 433, 439; 307/9.1; 290/1 A
See application file for complete search history.

(56) References Cited

U.S. PATENT DOCUMENTS

| | | | | |
|---|---|---|---|---|
| 5,811,201 | A * | 9/1998 | Skowronski | H01M 8/04 204/269 |
| 7,118,818 | B2 * | 10/2006 | Agnew | H01M 8/04022 429/423 |
| 2002/0039672 | A1 * | 4/2002 | Aramaki | B60L 11/1881 429/410 |
| 2004/0013913 | A1 * | 1/2004 | Fabis | H01M 8/04007 429/442 |
| 2006/0105207 | A1 * | 5/2006 | Lundberg | F01D 15/00 429/410 |

(Continued)

OTHER PUBLICATIONS

Office Action dated Sep. 18, 2015 in French Application No. 1553497.

*Primary Examiner* — Sean P Cullen
(74) *Attorney, Agent, or Firm* — Snell & Wilmer L.L.P.

(57) ABSTRACT

An integrated hybrid emergency power system having various features is disclosed. A hybrid emergency power system may have an auxiliary power unit and an emergency power unit. The emergency power unit may have a fuel cell. The auxiliary power unit may have an engine. The emergency power unit may be connected to the auxiliary power unit by an emergency power unit efficiency improvement apparatus. In this manner, the operating efficiency of the emergency power unit may be enhanced.

15 Claims, 3 Drawing Sheets

(56) References Cited

U.S. PATENT DOCUMENTS

| | | | |
|---|---|---|---|
| 2008/0070078 A1* | 3/2008 | Gummalla | B64D 41/00 429/410 |
| 2009/0309364 A1* | 12/2009 | Marconi | B64D 41/00 290/52 |
| 2010/0221642 A1* | 9/2010 | Frahm | B64D 11/02 429/512 |
| 2014/0087283 A1* | 3/2014 | Stolte | H01M 8/249 429/435 |

* cited by examiner

US 9,871,260 B2

HYBRID EMERGENCY POWER UNIT SYSTEM

FIELD

The present invention relates to the field of electrical power generation. More particularly, the present disclosure relates to an airborne emergency electrical power system capable of operating in the event of an aircraft engine failure.

BACKGROUND

Airplanes have utilized various emergency power units ("EPUs") to provide electrical power in the event of an engine failure. However, existing emergency power units encounter operational challenges. For example, ram air turbines can be damaged during deployment into the aircraft's slipstream. Also, compressor bleed air driven systems are inoperable if the main engine fails unless there is a low-pressure spool generator operating during wind milling of the main engine fan(s), though this spool generator adds unwanted weight and complexity. Moreover, solid propellant-based power systems are unstable and prone to contamination and aging, and extant fuel cell based emergency power units require near-atmospheric inlet air pressure and relatively high inlet temperatures. Thus, there is a need for an advanced integrated hybrid EPU that overcomes these challenges while providing reliable onboard emergency electrical power.

SUMMARY OF THE INVENTION

In accordance with various aspects of the present invention, an integrated energy conversion system is disclosed.

An energy conversion system may have an integrated emergency power unit, an auxiliary power unit (APU), and an emergency power unit efficiency improvement apparatus. The emergency power unit may have a fuel cell. The auxiliary power unit may have an engine and a generator wherein the engine drives the generator to produce electrical power. The emergency power unit efficiency improvement apparatus may have a heat exchanger and a bypass valve. The heat exchanger may be in fluidic communication with the emergency power unit and the auxiliary power unit.

In some embodiments, an energy conversion system may have an emergency power unit having a fuel cell, and an emergency power unit efficiency improvement apparatus having a heat exchanger and a bypass valve. The heat exchanger may be in fluidic communication with the emergency power unit. The heat exchanger may heat compressed air which is supplied to the inlet/air intake of the emergency power unit.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Figure 1:
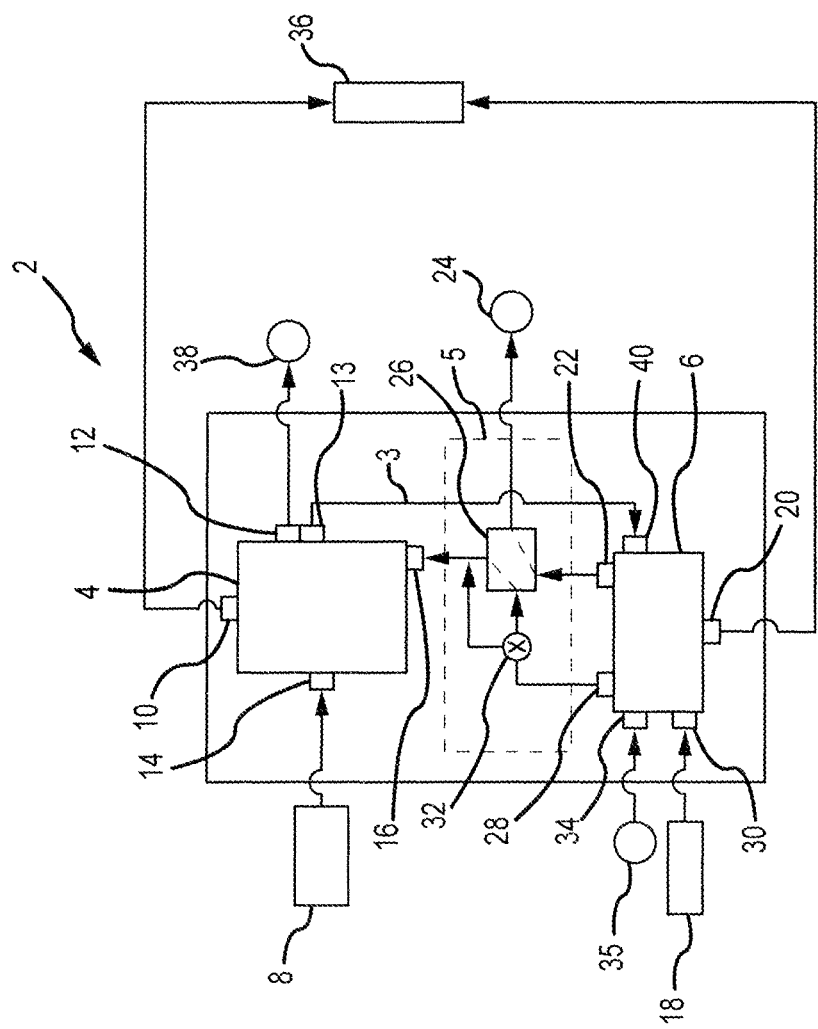
FIG. 1 depicts a diagram of an exemplary embodiment of an integrated hybrid emergency power system.

In various embodiments, an integrated energy conversion system is provided. With reference to FIG. 1, an energy conversion system 2 may comprise an emergency power unit 4, and an auxiliary power unit 6. An energy conversion system 2 may further comprise an emergency power unit efficiency improvement apparatus 5. The emergency power unit efficiency improvement apparatus 5 may be connected in fluid communication to both the emergency power unit 4 and the auxiliary power unit 6 and may provide selective fluidic connectivity between the emergency power unit 4 and the auxiliary power unit 6 whereby the efficiency of the emergency power unit 4 and/or the auxiliary power unit 6 may be improved. As used herein, to be connected in "fluid communication" or "fluidic communication" means that a passage exists between the connected elements via which a fluid, including a liquid and/or a gas and/or any other non-solid matter, may pass from one connected element to another connected element.

Figure 2:
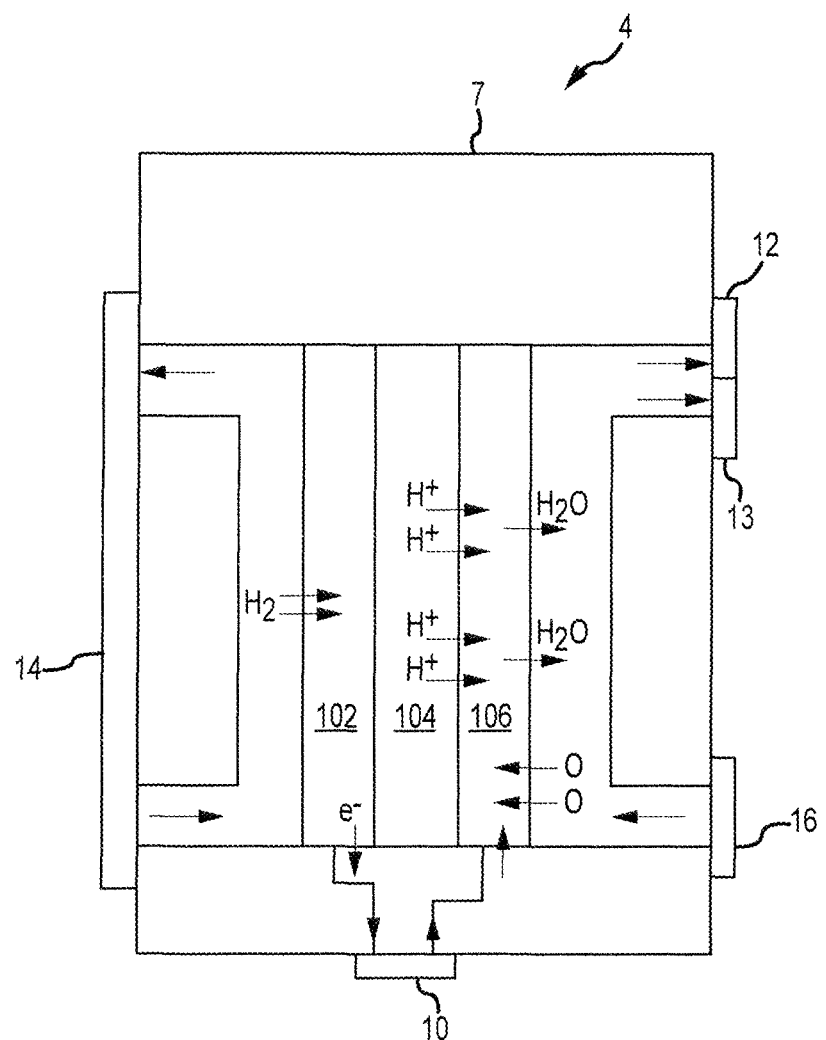
FIG. 2 depicts a fuel cell component of an integrated hybrid emergency power system.

With reference to FIGS. 1 and 2, an emergency power unit 4 may comprise a fuel cell 7. Moreover, the emergency power unit 4 may have numerous fluidic, electrical, and/or mechanical interconnections with other system elements. For example, the emergency power unit 4 may comprise a fuel input 14, an oxygen (e.g., $O_2$) input 16, a waste gas output 12, a water/water vapor waste output 13, and an electrical power output 10. As used herein, references to water also include water in non-liquid states, such as water vapor. One or more of the various inputs and outputs may be connected in fluidic and/or electrical communication to the fuel cell 7 directly or via the emergency power unit efficiency improvement apparatus 5.

The fuel input 14 may comprise a port in fluidic communication with a fuel supply 8. In various embodiments, the fuel input 14 comprises tubing, or a pipe, or an aperture interconnected with tubing or a pipe whereby fuel may be conveyed from a fuel supply 8 to the fuel cell 7. The fuel supply 8 may comprise hydrogen (e.g., $H_2$).

The oxygen input 16 may comprise tubing, or a pipe, or an aperture interconnected with tubing or a pipe in fluidic communication with a source of oxygen-containing gas. Thus, the oxygen input 16 may conduct oxygen to the fuel cell 7. In various embodiments, oxygen may be introduced via the drawing in of ambient air (which contains oxygen) from the surrounding environment. In various embodiments, the oxygen-containing air stream may be drawn in via the introduction of conditioned air from the aircraft cabin. However, in many aircraft applications, for example, during typical high-altitude cruise conditions, the air drawn from the ambient may have insufficient pressure, and/or insufficient temperature to provide for effective operation of the fuel cell 7. Thus, in various embodiments, the oxygen input 16 is in fluidic communication with the emergency power unit efficiency improvement apparatus 5. In this manner, the temperature and/or pressure of the air may be conditioned before it is introduced to the oxygen input 16.

The electrical power output 10 may comprise a conductive terminal in electrical communication with the fuel cell 7. The electrical power output 10 may comprise a single conductor, or may comprise two conductors or may comprise any number of conductors. The electrical power output 10 may provide power from the fuel cell 7 to an aircraft electrical bus 36.

The waste gas output 12 may comprise a tubing, or a pipe, or an aperture interconnected with tubing or a pipe in fluidic communication with a waste gas sink 38. In this manner, the waste gas output 12 may conduct waste gas from the fuel cell 7 to the waste gas sink 38. In various embodiments, the waste gas comprises nitrogen, for instance, $N_2$. Moreover, the waste gas sink 38 may comprise a fire extinguishing system. Thus, the waste gas from the fuel cell 7 may be repurposed, for example to charge a fire extinguishing system with nitrogen gas. In various embodiments, the waste gas sink 38 comprises an onboard fuel tank inerting system. For instance, the waste gas from the fuel cell 7 may be repurposed to supply a fuel tank with the waste gas. Because the waste gas may be a relatively unreactive (e.g., chemically inert) gas, such as $N_2$, this causes the fuel tank ullage environment to become relatively unreactive, diminishing the propensity for fuel vapors collecting in the ullage and improving aircraft safety.

The water/water vapor waste output 13 may comprise a tubing, or a pipe, or an aperture interconnected with tubing or a pipe in fluidic communication an emergency power unit efficiency improvement apparatus 5. As will be discussed further herein, the emergency power unit efficiency improvement apparatus 5 may comprise a fluidic interconnection between the water/water vapor waste output 13 and an auxiliary power unit 6 so that the water may be injected into the auxiliary power unit 6 to increase the auxiliary power unit 6 performance, for instance, by densifying the air entering an engine 44 (with momentary reference to FIG. 3) of the auxiliary power unit 6 and/or providing cooling, resulting in improved thermodynamic cycle efficiency.

Figure 3:
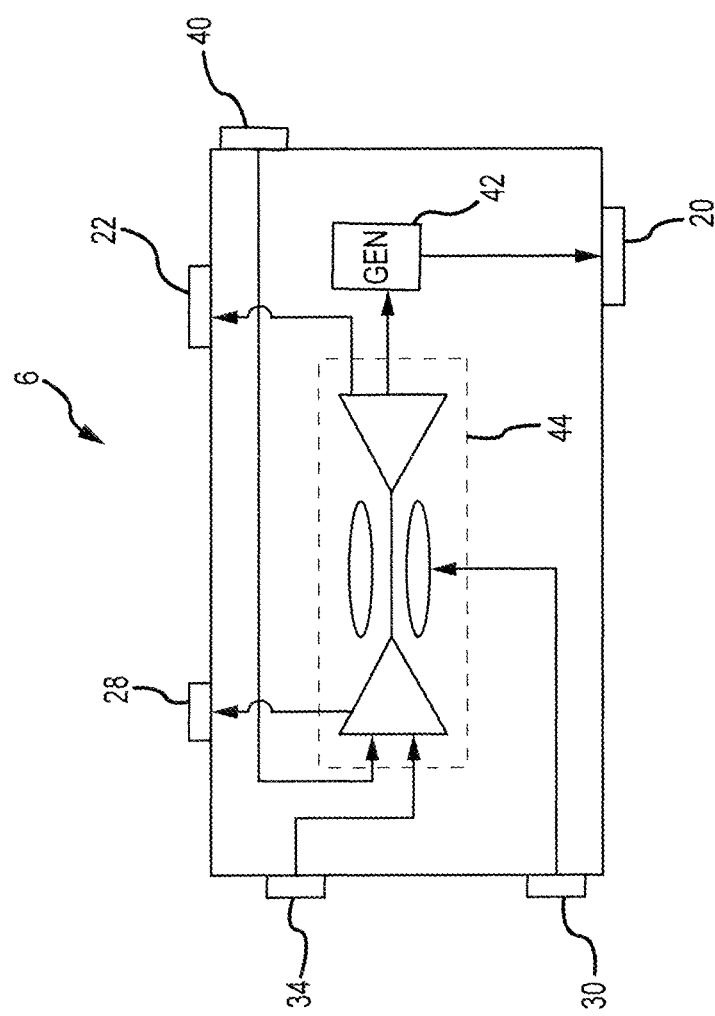
FIG. 3 depicts an auxiliary power unit component of an integrated hybrid emergency power system.

With reference to FIGS. 1 and 3, an energy conversion system 2 also may comprise an auxiliary power unit 6. The auxiliary power unit 6 may comprise an engine 44 and generator 42 whereby electricity may be generated. The engine 44 may be connected to the generator 42 via a shaft. The auxiliary power unit 6 may have numerous fluidic, electrical, and/or mechanical interconnections with other system elements. For example, the auxiliary power unit 6 may comprise an air input 34, a fuel input 30, a water input 40, a bleed air output 28, and a waste output 22. All the various inputs and outputs may be connected in fluidic and/or electrical communication to the engine 44 and/or generator 42 elements of the auxiliary power unit 6.

An auxiliary power unit 6 may comprise an air input 34. The air input 34 may comprise a tubing, or a pipe, or an aperture interconnected with tubing or a pipe in fluidic communication with an air source 35. For example, the air input 34 may comprise an inlet port of the engine 44 whereby ambient air may be drawn into the engine 44 during combustion.

An auxiliary power unit 6 may comprise a fuel input 30. The fuel input 30 may comprise a port in fluidic communication with a fuel supply 18. The fuel input 30 may conduct fuel from the fuel supply 18 to the engine 44, wherein it is combusted with the air provided through the air input 34.

An auxiliary power unit 6 may comprise a waste output 22. The waste output 22 may be in fluidic communication with the emergency power unit efficiency improvement apparatus 5. The waste output 22 may conduct waste, for example, products of combustion and/or uncombusted gases from the engine 44. The emergency power unit efficiency improvement apparatus 5 may conduct the waste to an exhaust sink 24 as discussed further herein.

An auxiliary power unit 6 may comprise a water input 40. As discussed herein above, the emergency power unit efficiency improvement apparatus 5 may comprise an interconnection between a turbine inlet of an engine 44 of the auxiliary power unit 6 and the water/water vapor waste output 13 so that the water/water vapor may be injected into the engine 44 of the auxiliary power unit 6 to increase the engine performance, for instance, by densifying the air entering the engine and/or providing cooling. This water/water vapor is injected via the water input 40. The water input 40 comprises a port wherein the water may be introduced and through which the water may be conveyed to the inlet of the compressor of the engine 44. The water/water vapor is introduced into an inlet of the engine 44. The water cools the ambient inlet air (through evaporative cooling), whereby the air is densified and thus combustion within the engine 44 may be made more efficient. In certain ground maintenance applications, the injected water may be used in conjunction with conventional compressor washing devices/systems. Compressor washing improves the overall gas turbine engine's thermodynamic efficiency by removing agglomerated dirt/dust/sand/etc. from the compressor's blades/vanes.

An auxiliary power unit 6 may comprise a bleed air output 28. The bleed air output 28 may comprise a tubing, or a pipe, or an aperture interconnected with tubing or a pipe whereby air may be channeled from the engine 44 prior to being combusted and out the auxiliary power unit 6. The bleed air output 28 may be connected in fluidic communication with the emergency power unit efficiency improvement apparatus 5. Thus, in this manner, pressurized, hot, uncombusted air may be conveyed from the auxiliary power unit 6 to the emergency power unit 4.

An auxiliary power unit 6 may comprise an electrical power output 20. The electrical power output 20 may comprise a conductive terminal in electrical communication with generator 42. The electrical power output 20 may comprise a single conductor, or may comprise two conductors or may comprise any number of conductors. The electrical power output 20 may provide power from the generator 42 to an aircraft electrical bus 36.

With reference to FIG. 1, an energy conversion system 2 may comprise an emergency power unit efficiency improvement apparatus 5. The emergency power unit efficiency improvement apparatus 5 has various fluidic interconnections between the auxiliary power unit 6 and the emergency power unit 4. For example, an emergency power unit 4 may comprise a fuel cell 7, which may receive hydrogen and oxygen and generate electricity, outputting effluent such as water and gas, for instance, nitrogen gas. Thus, a fuel cell 7

(with momentary reference to FIG. 2) requires an input fuel and an input oxidizer. However, the performance of a fuel cell 7 is often significantly degraded in the event that the oxidizer is input at a low pressure, or the fuel cell 7 is made to operate at a low temperature. This can cause challenges when operating in an aircraft environment due to the diminishment of ambient pressure and ambient temperature at altitudes above sea level (for example, up to the tropopause range).

Consequently, an emergency power unit efficiency improvement apparatus 5 may comprise fluidic connections whereby the input pressure and operating temperature of the fuel cell 7 is increased.

An emergency power unit efficiency improvement apparatus 5 may provide selective fluidic connectivity between the emergency power unit 4 and the auxiliary power unit 6. An emergency power unit efficiency improvement apparatus 5 may comprise a heat exchanger 26 and a bypass valve 32. As used herein, a heat exchanger may include a recuperator. The heat exchanger 26 may comprise at least two fluid paths not in fluidic communication wherein heat may be conducted from one fluid path to the other. The heat exchanger 26 may be connected to the waste output 22 of the auxiliary power unit 6. The heat exchanger 26 may conduct the hot exhaust stream leaving the engine 44 via the waste output 22 to an exhaust sink 24. However, the heat exchanger 26 may harvest heat from this exhaust stream and conduct it away, for example, to warm/pre-heat the air entering the oxygen input 16 of the emergency power unit 4. Thus, the heat exchanger 26 may also receive compressed air from the bleed air output 28 of the engine 44. The heat exchanger 26 may warm this air and subsequently conduct this air to the oxygen input 16 of the emergency power unit 4. In this manner, the emergency power unit 4 may receive warmed, non-combusted air that is pressurized by the engine 44. In various embodiments, a bypass valve 32 is disposed in connection with the heat exchanger 26. The bypass valve 32 may be operated to permit the air from the bleed air output 28 of the engine 44 to bypass the heat exchanger 26 and connect directly to the oxygen input 16 of the emergency power unit 4. For example, during low altitude operations (where ambient air pressure and temperatures are high), warming of the air may be unnecessary, and thus the bypass valve 32 may be activated.

Accordingly, the emergency power unit efficiency improvement apparatus 5 may provide air to the oxygen input 16 of the emergency power unit 4 which is at least one of warmed and pressurized. Similarly, the emergency power unit efficiency improvement apparatus 5 may conduct gas/fluid from the emergency power unit 4 to the auxiliary power unit 6. The emergency power unit efficiency improvement apparatus 5 may comprise a first tubing 3 disposed between the water/water vapor waste output 13 of the emergency power unit 4 and the water input 40 of the auxiliary power unit 6. The emergency power unit 4 may produce water/water vapor, for example as a product of chemical reaction(s) in the fuel cell 7. The first tubing 3 may conduct this water to the auxiliary power unit 6 where it is injected into the inlet of the engine 44. As discussed previously, this water may cool and/or densify the air entering the engine.

With reference now to FIG. 2, various aspects of an emergency power unit 4 comprising a fuel cell 7 are disclosed. The fuel cell may be a hydrogen fuel cell and may comprise an anode 102, an electrolyte 104, and a cathode 106. At the anode 102, the hydrogen fuel is electrochemically dissociated in the presence of a catalyst into hydrogen ions and free electrons ($2H_2 \rightarrow 4H^+ + 4e^-$). The electrons flow out the anode 102 to the electrical power output 10. The hydrogen ions flow into the electrolyte 104 and are driven by concentration forces and potential forces to the cathode 106, where oxygen gas is electrochemically combined in the presence of a catalyst with hydrogen ions and free electrons (conducted from the circuit return path of the electrical power output 10) to generate water ($O_2 + 4H^+ + 4e^- \rightarrow 2H_2O$). Thus the overall reaction in the fuel cell 7 comprises $2H_2 + O_2 \rightarrow 2H_2O + Energy$. The amount of energy released is equal to the difference between the Gibbs free energy of the product and the Gibbs free energy of the reactants. This energy, conducted via the electrical power output 10 to the aircraft electrical bus 36 (FIG. 1) may be utilized to power aircraft systems.

An emergency power unit 4 may also be utilized in reverse so that rather than generating electricity, electricity and water can be consumed and oxygen and hydrogen created. For instance, when an aircraft is on the ground, the emergency power unit 4 may be utilized in reverse so that the fuel cell 7 generates oxygen, for instance, for cabin pressurization, and hydrogen, for example, for fuel for the fuel cell 7 when it is utilized in conventional mode, for example, when aloft. For instance, an external voltage may be applied to the electrical power output 10, whereupon the electrical power output 10 is actually used as a power input. Water at the cathode 106 may undergo electrolysis, forming hydrogen and oxide ions. The oxide ions are transported through the electrolyte 104 to the anode 102 where they are oxidized to form oxygen. In this reverse mode, the polarity of the cell is opposite to that during typical operation. Thus, the fuel cell 7 operates according to the following equations. A cathode 106 reaction may occur wherein $H_2O + 2e^- \rightarrow H_2 + O_2^-$. An anode 102 reaction may occur wherein $O^{2-} \rightarrow \frac{1}{2}O_2 + 2e^-$. Thus, the net fuel cell reaction may be $H_2O \rightarrow \frac{1}{2}O_2 + H_2$.

Moreover, the fuel cell 7 may not be a hydrogen fuel cell but may comprise other fuel cell configurations. For instance, the fuel cell 7 may be an alkaline fuel cell, a phosphoric acid fuel cell, a proton exchange membrane fuel cell, a molten carbonate fuel cell, a direct alcohol fuel cell, a methanol fuel cell, a solid oxide fuel cell, or any other type of fuel cell configured to provide desired operational characteristics.

With reference now to FIG. 3, an auxiliary power unit 6 may comprise an engine 44 and a generator 42. The engine 44 may comprise a gas turbine powered by the same fuel as the aircraft main engines, for example a kerosene-type jet fuel such as Jet A, Jet A-1, JP-5, and/or JP-8. Alternatively, the fuel may be a wide-cut or naphtha-type jet fuel, such as Jet B and/or JP4. Furthermore, the fuel may be a synthetic fuel, such as Fischer-Tropsch Synthetic Paraffinic Kerosene (FT-SPK) fuel, or Bio-Derived Synthetic Paraffinic Kerosene (Bio-SPK), or may be any other suitable fuel. Alternatively, the engine 44 may comprise an internal combustion reciprocating engine, such as one based on Otto cycle, or Diesel cycle, or Miller cycle, or Atkinson cycle, or an internal combustion rotary engine (e.g., Wankel), or another internal combustion engine, or an external combustion continuous engine such as a gas turbine engine (based on the open Brayton cycle) powered by a different fuel than the aircraft engines, or any other heat engine. Furthermore, the engine 44 can be an internal combustion engine which is naturally aspirated or with forced induction (either turbocharged or super-charged). The engine 44 may have a turbocharger which may be a single or dual (twin) configuration using a centrifugal compressor directly coupled to either an axial inflow- or centrifugal inflow turbine, and whose operation may be further enhanced by structures such as: variable vane geometries, articulated waste gates, blow-off/pressure relief valves, and by methods such as: intercooling, water spray injection, etc. The engine 44 may be mechanically connected to a generator 42 and may spin the generator 42 (for example, through a mechanical gearbox) whereby electricity is generated. The generator 42 may be electrically connected to the electrical power output 20 by internal wiring. Thus, the auxiliary power unit 6 may provide power via the electrical power output 20 as discussed previously.

An engine 44 may further be in fluidic communication with the fuel input 30 of the auxiliary power unit 6 so that fuel is directed to combustion chamber(s) of the engine 44 where it is combusted with an oxidizer, such as air, provided via the air input 34 also in fluidic communication with the engine 44. Similarly, as discussed previously, an engine 44 may be in fluidic communication with the water input 40 of the auxiliary power unit 6 so that water is directed into the engine 44 so that the oxidizer, such as air, provided via the air input 34 may be cooled and/or densified, so that the efficiency of the engine 44 is improved.

In various embodiments, the bleed air output 28 is in fluidic communication with the engine 44, for example, with a compressor stage of a turbine engine, so that pressurized, but uncombusted air may be channeled to the bleed air output 28 for use by other aircraft systems.

Finally, the waste output 22 may be in fluidic communication with the output stage of the engine 44, for example, with an output stage of a turbine engine, so that the products of combustion may be channeled away from the engine 44. In various embodiments, the products of combustion are channeled via heat exchanger 26 to an exhaust sink 24. The exhaust sink 24 may comprise a turbine exhaust, for instance, a vent to the outside environment. Thus, the products of combustion may be expelled from the aircraft.

Having discussed various aspects of an energy conversion system 2, an energy conversion system 2 may be made of many different materials or combinations of materials. For example, various components of the system may be made from metal. For example, various aspects of an energy conversion system 2 may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of energy conversion systems 2 as disclosed herein are made of different materials or combinations of materials, and/or may comprise coatings.

In various embodiments, energy conversion systems 2 may comprise multiple materials, or any material configuration suitable to enhance or reinforce the resiliency and/or support of the system when subjected to wear in an aircraft operating environment or to satisfy other desired electromagnetic, chemical, physical, or material properties, for example radar signature, heat generation, efficiency, electrical output, strength, or heat tolerance.

In various embodiments, various components may comprise an austenitic nickel-chromium-based alloy such as Inconel®, which is available from Special Metals Corporation of New Hartford, N.Y., USA. In various embodiments, various components may comprise ceramic matrix composite (CMC). Moreover, various aspects may comprise refractory metal, for example, an alloy of titanium, for example titanium-zirconium-molybdenum (TZM).

While the systems described herein have been described in the context of aircraft applications; however, one will appreciate in light of the present disclosure, that the systems described herein may be used in various other applications, for example, different vehicles, such as cars, trucks, busses, trains, boats, and submersible vehicles, space vehicles including manned and unmanned orbital and sub-orbital vehicles, or any other vehicle or device, or in connection with industrial processes, or propulsion systems, or any other system or process having need for electrical power generation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An integrated energy conversion system comprising:
an emergency power unit comprising a fuel cell having an electrical power output and a water waste output, wherein the electrical power output of the fuel cell is in electronic communication with an aircraft electrical bus; and
an emergency power unit efficiency improvement apparatus comprising a heat exchanger, a first tubing adapted to permit water to be conveyed from the fuel cell to an auxiliary power unit, and a bypass valve, the heat exchanger in fluidic communication with the emergency power unit,
wherein a water waste output is configured to release the water from the fuel cell, the water waste output is in fluidic communication with the first tubing, a fluidic interconnection between the water waste output of the emergency power unit and the auxiliary power unit, wherein the fluidic interconnection is configured to inject the water into an inlet of a compressor of an engine of the auxiliary power unit;
wherein the heat exchanger is configured to heat compressed air and supply the compressed air to an inlet of the emergency power unit, wherein the compressed air is uncombusted, wherein the bypass valve is configured to selectively bypass the heat exchanger and connect directly to an oxygen input of the emergency power unit.

2. The integrated energy conversion system of claim 1, wherein the emergency power unit efficiency improvement apparatus comprises:
wherein the bypass valve is configured to selectively convey the compressed air to the emergency power unit without warming.

3. The integrated energy conversion system of claim 2, wherein the emergency power unit comprises:
a fuel input comprising an aperture interconnected with a pipe configured to convey fuel to the fuel cell;
the oxygen input comprising an aperture in fluidic communication with the emergency power unit efficiency improvement apparatus; and
a gas waste output configured to release gas waste from the fuel cell.

4. The integrated energy conversion system of claim 3, wherein the emergency power unit efficiency improvement apparatus comprises:
wherein the heat exchanger comprises a first fluid path and a second fluid path,
whereby the first fluid path is configured to accept pressurized air from a bypass air output of the engine of the auxiliary power unit,
whereby the second fluid path is configured to accept waste received from a waste output of the engine of the auxiliary power unit.

5. The integrated energy conversion system of claim 4, wherein the fuel cell is a hydrogen fuel cell.

6. An integrated energy conversion system comprising:
an emergency power unit comprising a fuel cell, wherein the fuel cell comprises an electrical power output, an oxygen input, and a water waste output, wherein the electrical power output of the fuel cell is in electronic communication with an aircraft electrical bus;
an auxiliary power unit comprising an engine and a generator, wherein the engine is configured to drive the generator to produce electrical power, wherein the engine comprises a bleed air output for pressurized air, wherein a water input of the auxiliary power unit is in fluid communication with the water waste output of the fuel cell, wherein an electrical power output of the auxiliary power unit is in electronic communication with the aircraft electrical bus; and
an emergency power unit efficiency improvement apparatus comprising a heat exchanger and a bypass valve, the heat exchanger in fluidic communication with the emergency power unit and the auxiliary power unit, wherein the heat exchanger is configured to conduct an exhaust stream leaving the engine from a waste output of the engine to an exhaust sink and warm the pressurized air entering the oxygen input of the fuel cell from the bleed air output of the engine, wherein the pressurized air is uncombusted,
wherein the bypass valve is configured to selectively bypass the heat exchanger and connect directly to the oxygen input;
wherein the emergency power unit efficiency improvement apparatus comprises a first tubing configured to convey water from the fuel cell to the engine, wherein the water waste output is in fluidic communication with the first tubing of the emergency power unit efficiency improvement apparatus, and wherein the first tubing is configured to convey the water from the emergency power unit to the auxiliary power unit and inject the water into an inlet of a compressor of the auxiliary power unit.

7. The integrated energy conversion system of claim 6, wherein the engine comprises a gas turbine.

8. The integrated energy conversion system of claim 6, wherein the fuel cell comprises a hydrogen fuel cell.

9. The integrated energy conversion system of claim 6, wherein the integrated energy conversion system is installed in an aircraft.

10. The integrated energy conversion system of claim 6, wherein the heat exchanger is configured to selectively warm compressed air and convey the compressed air from the engine to the fuel cell.

11. The integrated energy conversion system of claim 10, wherein the fuel cell comprises:
a fuel input comprising an aperture configured to interconnect with a pipe, wherein the pipe is configured to convey fuel from a fuel supply to the fuel cell;
the oxygen input comprising an aperture in fluidic communication with the emergency power unit efficiency improvement apparatus;
a gas waste output in fluidic communication with a waste gas sink.

12. The integrated energy conversion system of claim 11, wherein the waste gas sink comprises a fire extinguishing system.

13. The integrated energy conversion system of claim 11, wherein the waste gas sink comprises a fuel tank inerting system.

14. The integrated energy conversion system of claim 11, wherein the auxiliary power unit comprises:
a gas turbine; and
an electrical generator,
wherein the gas turbine drives the electrical generator, and
wherein the generator is connected to the electrical power output of the auxiliary power unit and connected to the aircraft electrical bus.

15. The integrated energy conversion system of claim 14, wherein the emergency power unit efficiency improvement apparatus comprises:
the heat exchanger comprising a first fluid path and a second fluid path, wherein the first fluid path is configured to accept the pressurized air from the bleed air output of the gas turbine, wherein the second fluid path is configured to accept waste received from a waste output of the gas turbine, and wherein the pressurized air is configured to warm in response to the waste and conveyed to the oxygen input of the fuel cell of the emergency power unit.

* * * * *